United States Patent [19]

Jones

[11] 4,428,822
[45] Jan. 31, 1984

[54] FLUID CATALYTIC CRACKING
[75] Inventor: Henry B. Jones, Houston, Tex.
[73] Assignee: Texaco Inc., White Plains, N.Y.
[21] Appl. No.: 371,863
[22] Filed: Apr. 26, 1982
[51] Int. Cl.$^3$ .................... C10G 51/00; C10G 11/18; B01J 37/14
[52] U.S. Cl. ..................................... 208/76; 208/159; 208/163; 502/41
[58] Field of Search ............... 208/153, 159, 163, 164, 208/76; 252/411 R, 417

[56] References Cited

U.S. PATENT DOCUMENTS

| | | | |
|---|---|---|---|
| 2,994,659 | 8/1961 | Slyngstad et al. | 208/113 |
| 3,812,029 | 5/1974 | Snyder, Jr. | 208/113 |
| 3,856,659 | 12/1974 | Owen | 208/80 |
| 3,894,933 | 7/1975 | Owen et al. | 208/77 |

*Primary Examiner*—Delbert E. Gantz
*Assistant Examiner*—O. Chaudhuri

*Attorney, Agent, or Firm*—Carl G. Ries; Robert A. Kulason; Robert Knox, Jr.

[57] ABSTRACT

A method for maintaining a desired catalyst regeneration temperature in a fluid catalytic cracking unit operating with complete combustion of coke to carbon dioxide when the coke content of the spent catalyst supplied to the regeneration zone from the reaction zone is insufficient to maintain the temperature in the regeneration zone necessary for complete combustion of coke to carbon dioxide in which residual liquid hydrocarbon from the cracking reaction zone is introduced into contact with partially spent cracking catalyst at cracking reaction temperature effecting conversion of said residue to volatile reaction products and additional coke deposit on the spent catalyst in an amount sufficient to maintain the temperature in the regeneration zone necessary for complete combustion of coke to carbon dioxide and substantially complete removal of carbon from the catalyst.

6 Claims, 1 Drawing Figure

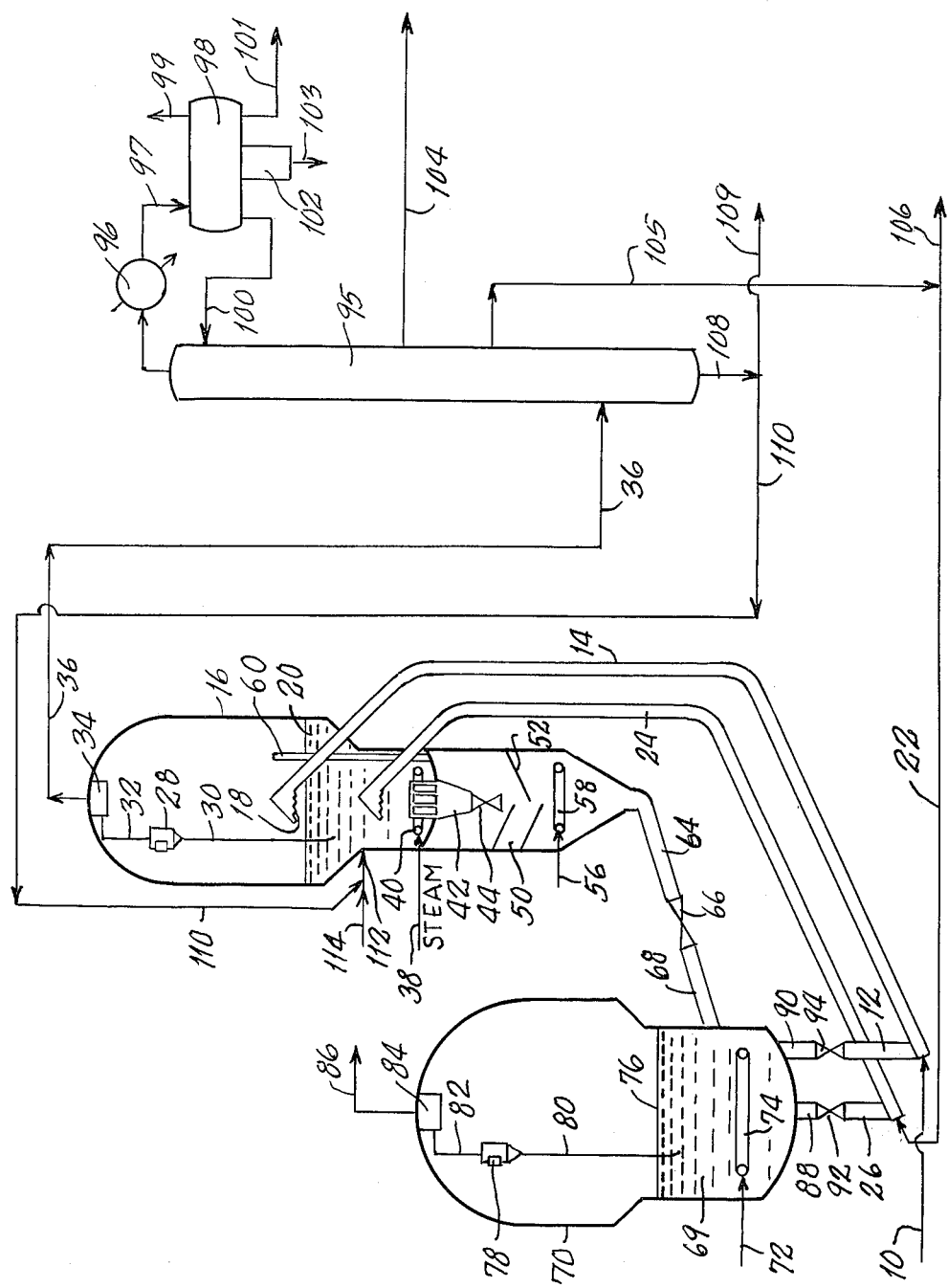

FLUID CATALYTIC CRACKING

This invention relates to an improvement in a fluid catalytic cracking process. In one of its more specific aspects, this invention relates to a method for maintaining the temperature level in the regenerator of a fluid catalytic cracking unit within a range which ensures substantially complete removal of coke from the catalyst and substantially complete conversion of carbon monoxide to carbon dioxide.

Fluidized catalytic cracking processes for conversion of hydrocarbons are well known in the art. In these processes, a hydrocarbon feedstock is contacted with a particulate cracking catalyst in either a dense fluid bed type reaction zone or in a riser reactor wherein catalytic conversion of hydrocarbon feedstock takes place with the production of various gaseous and liquid products and coke. The coke deposits on the catalyst cause partial deactivation of the catalyst. Catalyst from the reaction zone, referred to as spent catalyst, is circulated to a regeneration zone to regenerate the catalyst by combustion of coke deposits therefrom with an oxygen-containing gas and to heat the catalyst to a temperature higher than that in the reaction zone. The hot regenerated catalyst is returned to the reaction zone.

In the reaction zone, a suitable hydrocarbon feedstock, e.g. virgin gas oil, or recycle gas oil, is contacted with the catalyst at an elevated temperature such that substantial portions of the hydrocarbon feedstock are transformed into desirable products, including motor fuels, liquid and gaseous fuels, and chemical feedstocks with the simultaneous production of coke deposits on the catalyst. Such coke deposits reduce the activity and selectivity of the catalyst for the production of desired products. It is customary to maintain both the activity and selectivity of the catalyst by removing coke deposits from the catalyst by oxidation. Reactivation of the catalyst is normally carried out by withdrawing catalyst from the reaction zone to the regeneration zone where the spent catalyst is contacted with air at a temperature above about 1000° F. which serves to burn the coke from the catalyst. Coke deposited on the catalyst in the reaction zone normally contains vaporizable hydrocarbons, including valuable reaction products which are occluded or adsorbed by the catalyst or the coke. It is customary practice to strip the entrained and adsorbed hydrocarbons from the spent catalyst prior to regeneration with air by passing the catalyst from the reaction zone to a stripping zone prior to regeneration with oxygen-containing gas in the regeneration zone.

Regeneration of spent catalyst may be carried out by contacting stripped spent catalyst with air or other oxygen-containing regeneration gas at a temperature in the range of 1250° to 1500° F. in a transport type or riser regenerator or in a fluidized dense bed type regenerator. In the transport type regenerator, spent catalyst particles are suspended in regeneration gas and regenerated while in transit from one vessel to another.

In a fluidized bed type regenerator, oxygen-containing regeneration gas is passed upwardly through a bed of stripped, spent catalyst at a velocity effective for fluidization of the catalyst particles.

Flue gases resulting from combustion of carbon from the catalyst usually contains fine particles of catalyst entrained by the regeneration gas and resulting flue gases. Catalyst entrained in the flue gases is recovered by gas-solid separation apparatus, usually cyclone separators, located in the upper portion of the vessel in which regenerated catalyst is disengaged from flue gases. Catalyst separated from the flue gas is returned to a bed of regenerated catalyst in the lower portion of the vessel and flue gas comprising water vapor, nitrogen, carbon dioxide, and small amounts of oxygen, carbon monoxide and entrained catalyst fines are discharged from the upper portion of the vessel. Regenerated catalyst of substantially reduced carbon content is withdrawn from the bed of regenerated catalyst in the lower portion of the vessel and returned to the cracking zone. Both bed type and riser type reactors and regenerators are well known in the art.

In the regeneration of catalytic cracking catalysts, particularly high activity molecular sieve type cracking catalysts, it is desirable to burn all or nearly all of the coke from the catalyst so that the residual carbon content of the regenerated catalyst is in the range of 0 to 0.1 weight percent, usually 0.01 to 0.05 weight percent. Molecular sieve cracking catalyst regenerated to such low carbon levels exhibit maximum activity and selectivity for conversion of hydrocarbon feedstocks to motor fuels and other desirable hydrocarbon products.

The yield of desirable products from a fluidized catalytic cracking process may be controlled within certain limits by varying hydrocarbon conversion conditions within the reaction zone, such as temperature, pressure, catalyst activity, and contact time, to maximize production of the desired product, for example motor gasoline blending components, heating oil, olefins and the like.

The subject invention relates to a method of control of temperature and catalyst activity. Hydrocarbon charge stocks may be heated to an elevated temperature in the range of 450° F. to 750° F. before they are charged to the catalytic cracking reactor. Preferably, the preheat temperature of the hydrocarbon chargestock does not exceed the temperature at which substantial thermal cracking begins to take place. Hydrocarbon preheat temperatures are generally lower than the desired cracking reaction temperature. The additional heat required to raise the conversion temperature in the reaction zone to the desired temperature is provided by the hot regenerated catalyst from the regeneration zone. In the regeneration zone where coke is burned from the stripped catalyst, the catalyst is raised to an elevated temperature, preferably within the range of from about 1250° F. to about 1500° F. The desired catalyst regeneration temperature may be controlled within the permissible limits of the thermal tolerance of the catalyst by controlling the amount of heat released by combustion of carbon from the spent catalyst in the regeneration zone.

In the past, with the older type catalysts, it was possible to regulate the temperature in the regeneration zone by controlling the amount of oxygen supplied to the regenerator. It was customary to limit the catalyst regeneration temperature to a maximum of about 1200° F. to avoid permanent deactivation of the catalyst and to return the catalyst to the reaction zone in an incompletely regenerated state, the regenerated catalyst usually containing of the order of 0.5 to 2 weight percent carbon. More recently, it has become common practice to regenerate the newer zeolite type cracking catalysts at temperatures above 1200° F., preferably in the range of 1250° to 1500° F., to very low carbon contents in the range of 0.01 to 0.1 weight percent carbon. This is accomplished by the use of an excess of oxygen-containing gas which consumes substantially all of the coke from the catalyst and oxidizes the products of combustion substantially completely to water and carbon dioxide. Even with complete combustion of the coke to fully oxidized products of reaction, there is often an insufficient quantity of coke deposited on the catalyst during the cracking reaction to maintain the desired regeneration temperature in the range of 1250° to 1500° F.

It has been proposed heretofore, in U.S. Pat. No. 3,966,587, to offset the deficiency in the coke content of the spent catalyst and to provide the additional heat required to maintain the regeneration zone fluidized dense phase catalyst bed at the desired temperature in the range of 1050° to 1450° F. by the addition of torch oil to the coke-contaminated spent catalyst supplied from the stripping zone to the regeneration zone.

The subject invention is specifically directed to an improved method for the operation of a fluid catalytic cracking unit in which the deficiency in coke laid down by the cracking reaction in the conversion of the usual hydrocarbon charge stocks to the desired products of reaction is made up by the introduction of additional carbon to the spent catalyst after it is separated from the reaction products of the fresh charge stock and prior to steam stripping. In accordance with my invention, the additional coke required to supply the deficiency of heat in the regeneration zone is provided by introducing a high carbon liquid residual fraction of the hydrocarbon conversion product into the reaction zone wherein at least a portion of the liquid residuum is converted to lower molecular weight products. The subject invention applies especially to fluid catalytic cracking units operating completely or predominently in a riser cracking mode.

BRIEF DESCRIPTION OF THE DRAWING

The process of this invention is illustrated in more detail in the accompanying drawing which is a diagrammatic representation of the process flow and of apparatus suitable for use for carrying out the process of this invention.

With reference to the drawing, as a specific example of a preferred embodiment of the process of this invention, a hydrocarbon charge stock, for example, a virgin gas oil, is supplied to a fluid catalytic cracking unit (FCCU) through line 10 into contact with hot regenerated equilibrium molecular sieve zeolite cracking catalyst from standpipe 12. The regenerated catalyst has a carbon content in the range of 0.01 to 0.1 weight percent and is at a temperature in the range of from about 1275° F. to about 1450° F. when introduced into contact with the hydrocarbon charge stock in fresh feed riser 14 comprising a part of the reactor of the FCCU.

The resulting suspension of catalyst in oil vapor at an initial temperature of about 925° F. passes upwardly through feed riser 14 at an average superficial vapor velocity within the range of from about 40 to 60 feet per second and is discharged into reactor-separator vessel 16. The fresh feed riser 14 terminates in a downwardly directed outlet which may be provided with a serrated edge 18, as illustrated, to provide smooth flow of fluid and suspended catalyst from conduit 14 into reactor vessel 16. During normal operation of the fluid catalytic cracking unit, the upper surface 20 of the dense phase fluidized catalyst bed is below serrated edge 18; under abnormal operating conditions, the bed level may fluctuate near the outlet of riser 14 as defined by serrated edge 18.

As a specific example of suitable reaction conditions in the riser reactor 14, the catalyst-to-oil ratio is preferably in the range of from about 5 to about 10 and the weight hourly space velocity is in the range of about 50 to about 100. In this particular example, at a catalyst to oil ratio of 5.6 and a weight hourly space velocity of 69.5, the average vapor velocity in the fresh feed riser 14 is about 22 feet per second providing a residence time of about 6.5 seconds. Substantial conversion of fresh feed occurs in the riser 14 and under the operating conditions of this example, approximately 49 volume percent of the fresh feed stock is converted to products boiling below 430° F. A heavy naphtha or cycle gas oil may be introduced through line 22 into the inlet section of second reactor riser 24 wherein it is contacted with hot zeolite catalyst as described above, supplied through standpipe 26. The resulting catalyst and vapor mixture passes upwardly through the recycle feed riser 24 and discharges into reactor vessel 16. The recycle riser 25 terminates in a downwardly directed outlet which discharges into the reactor vessel 16 at a point in the reactor below the terminus of fresh feed riser 14 and below the upper surface 20 of the dense bed of catalyst maintained in the reactor during normal operation. The outlet of recycle feed riser 24 preferably is provided with a serrated edge as illustrated to provide smooth flow of vapors and uniform fluidization of the catalyst in the reactor-separator.

As a specific example of suitable reaction conditions in recycle feed riser reactor, the catalyst-recycle oil vapor mixture at a temperature of about 930° F. passes upwardly through recycle feed riser 24 at an average velocity of about 25 feet per second with an average residence time of about 5 seconds. In this specific example, the catalyst-oil ratio in the recycle riser is about 5.5 with a weight hourly space velocity of 55 effecting conversion of about 28 percent of the cycle gas oil to products boiling below 430° F.

The effluent of the recycle feed riser 24 passes upwardly into a dense phase fluidized bed of catalyst in reactor 16 effecting further conversion of the cycle oil, for example, increasing the conversion in the above specific example to 33 volume percent product boiling below 430° F. In this specific example, in that portion of the catalyst bed between the bed surface 20 and the upper end of riser 24, the catalyst-to-oil ratio is about 16 with a weight hourly space velocity of 23 and the vapor velocities in the reactor vessel are 1.5 feet per second at the point where the recycle riser 24 discharges into the catalyst bed and about 1.2 feet per second at the point of vapor disengagement from the dense phase catalyst bed at its upper surface 20.

Products of the cracking reaction pass upwardly through the dilute phase section of reactor 16, above the upper surface 20 of the catalyst bed, into cyclone separator 28 wherein entrained catalyst is separated from the vapors and gases comprising unconverted hydrocarbons, reaction products, and inert gas diluent. The separated catalyst is returned to the fluidized bed of catalyst in the reactor through dipleg 30. Although a single cyclone separator is illustrated, it is customary to provide an assembly of several cyclone separators in series to achieve substantially complete separation of catalyst from vapors and gases leaving the reactor. As is well known in the art, a plurality of such assemblies may be employed in large reactors.

Effluent vapors and gases pass from cyclone separator 28 through line 32 to plenum chamber 34 wherein the vapors and gases from other cyclone separator assemblies, not illustrated, are collected and discharged from the reactor through line 36. Vapor line 36 conveys cracked products to fractionation facilities, described hereinafter, wherein the converted products are recovered and separated into desired product and recycle streams.

Steam may be introduced into the lower portion of reactor vessel 16 at a point below the outlet of recycle feed riser 24, the steam entering the reaction vessel from line 38 through a steam distributor ring 40 as illustrated in the figure. The dense phase bed of catalyst in the lower portion of reactor vessel 16 is stripped by steam from steam distributor 40 and is withdrawn through standpipe 42 as controlled by slide valve 44, into a stripping zone 50 in the lower part of the reactor vessel. Stripping zone 50 is provided with baffles 52 attached to the walls of stripper section 50 of vessel 16. Stripping steam is introduced into stripping zone 50 through line 56 and steam distributor ring 58, situated below baffles 52. Steam rising through the catalyst in stripping zone 50 displaces and removes sorbed and entrained hydrocarbon vapors from the catalyst. Stripping steam and stripped hydrocarbons are discharged from the stripper through stripper vent line 60 into the upper portion of reactor vessel 16.

Stripped catalyst is withdrawn from the bottom of stripper 50 through spent catalyst standpipe 64 at a rate controlled by slide valve 66 and discharged through standpipe 68 into a dense fluidized bed of catalyst 69 in regenerator 70. In regenerator 70, the spent catalyst is contacted with air introduced through line 72 and air distributor ring 78 into the lower portion of the dense phase fluidized bed of catalyst in regenerator 70. The dense phase fluidized bed of catalyst undergoing regeneration in regenerator 70 has a fairly well defined upper surface 76. Sufficient air is introduced into the regenerator through line 72 for complete combustion of all of the carbonaceous material from the catalyst undergoing regeneration. The resulting flue gas passes upwardly from the dense phase bed of catalyst into the dilute phase section of the catalyst regenerator above bed surface 76 and enters cyclone separator 78 wherein entrained catalyst is separated from the flue gas and returned to the dense phase fluidized bed of catalyst 70 through dipleg 80.

Cyclone separator 78, although represented diagrammatically as a single unit, may comprise one or more assemblies of cyclone separators arranged in parallel and in series as in reactor vessel 16, to effect substantially complete separation of entrained solids from the flue gases.

Effluent flue gas from cyclone 78 is passed through line 82 into the plenum chamber 84 and through flue line 86 to vent facilities, not shown, which may include means for recovery of energy from the hot flue gas stream. The flue gas discharged from regenerator 70 through line 86 consists essentially of nitrogen, carbon dioxide, and water vapor and one to 10 volume percent oxygen. Preferably, the regenerator flue gas, dry basis, comprises about 81 to 88 percent nitrogen, 10 to 16 percent carbon dioxide, and 2 to 5 percent oxygen together with trace amounts of carbon monoxide. Various means for recovering energy from hot flue gases discharged through line 86 prior to release to the atmosphere, such as generation of steam or expansion through gas turbines with the generation of power, are well known in the art.

Regenerated catalyst is withdrawn from the bottom of regenerator 70 through lines 88 and 90 at rates controlled by slide valves 92 and 94 to supply hot regenerated catalyst to standpipes 26 and 12, respectively, as described hereinabove.

Product vapor discharged from the reactor through line 36 passes from the reactor vessel 16 to a fractional distillation column 95 wherein products of reaction are separated into desired component fractions according to their boiling ranges. A vapor fraction comprising gasoline and lighter hydrocarbons passes overhead from the fractional distillation column 95 into condenser 96 wherein substantially all of the gasoline boiling range fraction is condensed. From the condenser 96, condensate and uncondensed vapors flow through line 97 into an accumulator vessel 98, wherein uncondensed vapors are separated from condensate. The uncondensed vapors, comprising gases and hydrocarbons in equilibrium with the condensed gasoline, are recovered from the accumulator 98 through line 99. A portion of the condensate comprising gasoline is passed from accumulator 98 via line 100 to the fractional distillation column 95 as reflux. Product gasoline is withdrawn from the accumulator vessel 98 through line 101 for further processing, not illustrated. Water, which comprises condensed stripping steam from the reactor vessel 16, collects in the accumulator leg 102 from which it is removed via line 103.

A liquid fraction comprising light cycle gas oil is withdrawn from the fractional distillation column 95 through line 104 to storage, not illustrated. A recycle stream comprising intermediate cycle gas oil is withdrawn from fractional distillation column 95 at a temperature of about 630° F. and passed via line 105 and line 22 to the inlet section of recycle riser 24 as hereinabove described. The temperature at which intermediate cycle gas oil stream is transferred to the reactor is about the boiling point temperature of the intermediate cycle gas oil fraction. If desired, an intermediate gas oil product may be recovered from line 105 via line 106 through which the intermediate cycle gas oil passes through storage, not illustrated. A heavy residuum or heavy cycle gas oil fraction is withdrawn from the bottom of fractional distillation column 95 through line 108. A part of the heavy cycle gas oil fraction may be passed through line 109 to storage, not illustrated.

In accordance with the present invention, heavy residuum or heavy cycle gas oil obtained as a bottoms fraction from fractional distillation column 95 is passed through line 110 to reactor vessel 16 where it is introduced into the fluidized bed of catalyst in the reactor vessel at a distance below outlet 18 of the fresh feed riser 14. The heavy cycle gas oil contacts the catalyst in vessel 16 after substantial disengagement of the catalyst from the products of cracking in the riser reactors. The heavy cycle gas oil from line 110 is injected into the catalyst bed through line 112 which may be provided with one or more steam atomizing spray nozzles. Steam for atomization is supplied through line 114. The amount of heavy cycle gas oil supplied to reactor 16 through line 112 is determined by the temperature in the dense phase bed of catalyst in regenerator 70.

A sufficient amount of heavy cycle gas oil is added to the catalyst in the dense phase fluidized bed in reactor 16 to maintain the desired temperature in the fluidized dense phase catalyst bed 69 of the regenerator 70. The process of this invention may be employed not only to maintain a desired controlled operating temperature in the fluidized dense phase bed of catalyst in the regeneration zone, but also to effect a change in the operating temperature in the fluidized dense phase bed of catalyst in the regeneration zone without the need for changing operating conditions within the reaction zone.

The amount of oxygen-containing regeneration gas necessary in the practice of the process of this invention will depend upon the amount of heavy cycle gas oil added to the dense phase fluidized bed of partially deactivated catalyst in the reactor-separator 16 and the amount of coke deposited on the catalyst in riser reactors 14 and 24. Generally, the oxygen-containing regeneration gas is provided in an amount sufficient to effect substantially complete combustion of all of the coke on the catalyst to carbon dioxide and water vapor and in addition to provide an oxygen concentration in the flue gas in the range of from about 1 to about 10 mole percent and preferably from about 2 to about 5 mole percent, dry basis. Typically coke contains from eight to eleven percent hydrogen by weight. Water vapor is produced during the regeneration of the catalyst by the consumption of hydrogen contained in the coke. Flue gas compositions throughout this specification are on a dry, i.e. moisture free, basis.

The oxygen-containing regeneration gases which may be employed in practicing the process of this invention include air and gases which contain molecular oxygen in admixture with inert gases. Air is a particularly suitable regeneration gas and is generally preferred. Additional gases which may be employed include oxygen in combination with carbon dioxide or flue gas or other inert gases.

In practicing the method of the present invention, a regenerated catalyst having a carbon-on-regenerated-catalyst (CORC) content in the range of 0.01 to 0.1 weight percent, is obtained at a regeneration temperature within the range of 1275° F. to 1450° F. when the spent catalyst average residence time in the fluidized dense phase catalyst bed in the regenerator is within the range of from about three to about ten minutes.

I claim:

1. In a continuous fluidized catalytic cracking process comprising cracking a naphtha or gas oil feedstock in a riser transport reaction zone and separating hydrocarbon vapor reaction products from coke-contaminated spent catalyst in a reaction-separation zone comprising a fluidized bed of spent catalyst, stripping said spent catalyst in a stripping zone, and regenerating stripped spent catalyst in a regeneration zone wherein coke-contaminated spent catalyst is regenerated at a temperature in the range of from about 1250° F. to about 1500° F. by contact with an oxygen-containing regeneration gas in an amount in excess of the amount theoretically required for complete combustion of coke on said spent catalyst to fully oxidized reaction products effecting substantially complete removal of coke from said catalyst and production of a flue gas comprising nitrogen and carbon dioxide substantially free from carbon monoxide and wherein the coke produced by cracking said feedstock is insufficient for providing heat required to maintain said temperature in said regeneration zone and a high carbon content residual hydrocarbon liquid product from said catalytic cracking process is introduced into said reaction-separation zone into intimate contact with said fluidized bed of coke-contaminated spent catalyst separated from said hydrocarbon vapors effecting cracking of said residual hydrocarbon to hydrocarbon vapors and an additional amount of coke deposit on said spent catalyst, the improvement which comprises supplying a sufficient additional quantity of oxygen-containing regeneration gas to said regeneration zone to consume said additional coke deposit and maintaining an excess of oxygen over that required for complete combustion of said coke including said additional amount of coke on said catalyst and from about one to ten mole percent oxygen and from about 0 to about 500 parts per million by volume carbon monoxide in said flue gas, increasing the amounts of said residual hydrocarbon and additional regeneration air when the temperature in said regeneration zone decreases and decreasing the said amounts when the temperature in said regeneration zone increases.

2. A process as defined in claim 1 wherein said oxygen is supplied in an amount sufficient to maintain an oxygen concentration in the range of two to five mole percent in said flue gas.

3. A process as defined in claim 1 wherein said residual hydrocarbon fraction from said cracking reaction products is introduced into said reaction-separation zone as a dispersion of atomized liquid in steam.

4. A process as defined in claim 1 wherein said fluidized bed temperature in said reaction-separation zone is within the range of 700° to 1000° F.

5. A process as defined in claim 1 wherein the carbon on the regenerated catalyst is maintained within the range of from about 0.01 to about 0.10 weight percent.

6. A process as defined in claim 1 wherein said catalyst regeneration temperature is in the range of 1275° F. to 1450° F.

* * * * *